US008807872B2

(12) United States Patent
Willis

(10) Patent No.: US 8,807,872 B2
(45) Date of Patent: Aug. 19, 2014

(54) METHOD AND APPARATUS FOR LAYING A MARINE PIPELINE

(75) Inventor: Stewart Willis, Aberdeenshire (GB)

(73) Assignee: Technip France SA (FR)

( * ) Notice: Subject to any disclaimer, the term of this patent is extended or adjusted under 35 U.S.C. 154(b) by 894 days.

(21) Appl. No.: 12/524,948

(22) PCT Filed: Feb. 4, 2008

(86) PCT No.: PCT/GB2008/000366
§ 371 (c)(1),
(2), (4) Date: Dec. 11, 2009

(87) PCT Pub. No.: WO2008/096107
PCT Pub. Date: Aug. 14, 2008

(65) Prior Publication Data
US 2010/0092244 A1    Apr. 15, 2010

(30) Foreign Application Priority Data

Feb. 5, 2007  (GB) .................................. 0702161.1

(51) Int. Cl.
F16L 1/19       (2006.01)
F16L 1/225      (2006.01)
H02G 1/08       (2006.01)
F16L 1/028      (2006.01)
F16L 1/26       (2006.01)
F16L 1/15       (2006.01)
F16L 1/23       (2006.01)

(52) U.S. Cl.
CPC ....................................... F16L 1/19 (2013.01)
USPC ..... 405/166; 405/154.1; 405/158; 405/168.1; 405/168.3

(58) Field of Classification Search
USPC ................. 405/154.1, 158, 166, 168.1, 168.3
See application file for complete search history.

(56) References Cited

U.S. PATENT DOCUMENTS 2,232,890 A * 2/1941 Stillwagon .................... 187/246
3,581,506 A * 6/1971 Howard ......................... 405/166
(Continued)

FOREIGN PATENT DOCUMENTS

EP          20257 A1 * 12/1980  ................ F16L 1/04
EP     1 696 163 A1    5/2006
(Continued)

OTHER PUBLICATIONS

International Search Report dated Aug. 8, 2008, issued in corresponding international application No. PCT/GB2008/000366.

(Continued)

Primary Examiner — John Kreck
Assistant Examiner — Edwin Toledo-Duran
(74) Attorney, Agent, or Firm — Ostrolenk Faber LLP

(57) ABSTRACT

Disclosed is an apparatus to be mounted on a vessel for laying a marine pipeline having accessories on the end of the pipeline and/or at one or more intermediate locations along the pipeline, the apparatus including a launch ramp having a guide for guiding and controlling the movement of a pipeline along a pipeline firing line in the direction of the seabed, a clamp downstream of the guide for selectively clamping and supporting the launched pipeline, wherein the launch ramp is provided with an opening downstream of the guide and upstream of the clamp for passage of an accessory between a storage position and an installation location in the pipeline firing line to allow the accessory to be connected to an end of the pipeline supported by the clamp.

35 Claims, 15 Drawing Sheets

(56) References Cited

U.S. PATENT DOCUMENTS

| | | | |
|---|---|---|---|
| 3,589,580 A * | 6/1971 | Smulders | 226/108 |
| 3,680,322 A * | 8/1972 | Nolan et al. | 405/166 |
| 3,745,601 A * | 7/1973 | Appelt | 14/77.3 |
| 3,776,320 A * | 12/1973 | Brown | 173/213 |
| 4,215,950 A * | 8/1980 | Stevenson | 405/168.4 |
| 4,230,421 A * | 10/1980 | Springett et al. | 405/168.3 |
| 4,264,234 A * | 4/1981 | Pras | 405/158 |
| 4,274,799 A * | 6/1981 | Tisdale et al. | 414/137.1 |
| 4,345,855 A * | 8/1982 | Uyeda et al. | 405/168.3 |
| 4,347,029 A * | 8/1982 | Latimer et al. | 414/22.58 |
| 4,413,925 A * | 11/1983 | Latimer | 405/195.1 |
| 4,486,123 A * | 12/1984 | Koch et al. | 405/169 |
| 4,594,871 A * | 6/1986 | de Boer | 405/168.3 |
| 4,687,376 A * | 8/1987 | Recalde | 405/168.3 |
| 4,721,410 A * | 1/1988 | Recalde | 405/168.3 |
| 4,721,411 A * | 1/1988 | Recalde | 405/168.3 |
| 4,723,874 A * | 2/1988 | Recalde | 405/168.3 |
| 4,802,794 A * | 2/1989 | Lynch | 405/168.3 |
| 4,810,132 A * | 3/1989 | Diehl | 405/166 |
| 5,292,108 A * | 3/1994 | Sutton | 254/323 |
| 5,348,423 A * | 9/1994 | Maloberti et al. | 405/166 |
| 5,421,675 A * | 6/1995 | Brown et al. | 405/158 |
| 5,464,307 A * | 11/1995 | Wilkins | 405/166 |
| 5,622,451 A * | 4/1997 | Lupi et al. | 405/158 |
| 6,004,071 A * | 12/1999 | Broeder et al. | 405/166 |
| 6,056,478 A * | 5/2000 | Martin et al. | 405/168.3 |
| 6,089,489 A * | 7/2000 | Cruickshank | 242/360 |
| 6,213,686 B1 * | 4/2001 | Baugh | 405/166 |
| 6,352,388 B1 * | 3/2002 | Seguin | 405/166 |
| 6,361,250 B1 * | 3/2002 | de Varax | 405/158 |
| 6,425,709 B1 * | 7/2002 | Frijns | 405/170 |
| 6,524,030 B1 * | 2/2003 | Giovannini et al. | 405/166 |
| 6,551,027 B2 * | 4/2003 | Willis et al. | 405/158 |
| 6,554,538 B2 * | 4/2003 | Stockstill | 405/168.3 |
| 6,588,981 B2 * | 7/2003 | Willis et al. | 405/168.1 |
| 6,592,297 B2 * | 7/2003 | Frijns et al. | 405/170 |
| 6,702,519 B2 * | 3/2004 | Stockstill | 405/168.3 |
| 6,733,208 B2 * | 5/2004 | Stockstill | 405/169 |
| 6,761,506 B2 * | 7/2004 | De Lang et al. | 405/168.3 |
| 6,776,560 B2 * | 8/2004 | Moszkowski et al. | 405/166 |
| 6,796,742 B1 | 9/2004 | Roger et al. | 405/166 |
| 6,843,619 B2 * | 1/2005 | Gelmi | 405/184.5 |
| 7,641,421 B2 * | 1/2010 | Roodenburg et al. | 405/166 |
| 2002/0021942 A1 * | 2/2002 | Willis et al. | 405/166 |
| 2003/0044235 A1 * | 3/2003 | Stockstill | 405/154.1 |
| 2003/0091395 A1 * | 5/2003 | Stockstill | 405/154.1 |
| 2003/0118409 A1 * | 6/2003 | Lang et al. | 405/168.1 |
| 2003/0147699 A1 * | 8/2003 | Long et al. | 405/158 |
| 2003/0219313 A1 * | 11/2003 | Giovannini et al. | 405/158 |
| 2003/0231931 A1 * | 12/2003 | Moszkowski et al. | 405/158 |
| 2005/0019100 A1 * | 1/2005 | Simpson | 405/166 |
| 2005/0207849 A1 * | 9/2005 | Roodenburg et al. | 405/166 |
| 2006/0275102 A1 * | 12/2006 | Willis | 414/138.4 |
| 2007/0189857 A1 * | 8/2007 | Vergouw et al. | 405/166 |
| 2008/0044233 A1 * | 2/2008 | O'Sullivan | 405/158 |

FOREIGN PATENT DOCUMENTS

| | | | |
|---|---|---|---|
| GB | 2070724 A * | 9/1981 | F16L 1/04 |
| GB | 2384538 B | 4/2005 | |
| WO | WO 93/06401 | 4/1993 | |
| WO | WO 93/06402 | 4/1993 | |
| WO | WO 95/22484 | 8/1995 | |
| WO | WO 96/18839 | 6/1996 | |
| WO | WO 03060366 A2 * | 7/2003 | |
| WO | WO 03/067019 A2 | 8/2003 | |
| WO | WO 2006/054891 A1 | 5/2006 | |
| WO | WO 2006/085739 A1 | 8/2006 | |
| WO | WO 2006/089786 A1 | 8/2006 | |
| WO | WO 2007/108673 A1 | 9/2007 | |
| WO | WO 2008/096107 | 8/2008 | |

OTHER PUBLICATIONS

Third Party Observation Art dated Mar. 25, 2010 issued in EP 2 122 219.

Deep Blue-Ship Technology. Retrieved Jan. 7 2013, from http://www.ship-technology.com/projects/deep_blue/.

Deep Blue—IMO 9215359. Retrieved Jan. 7 2013 from http://www.shipspotting.com/modules/myalbum/photo-1037945-Deep+Blue.

* cited by examiner

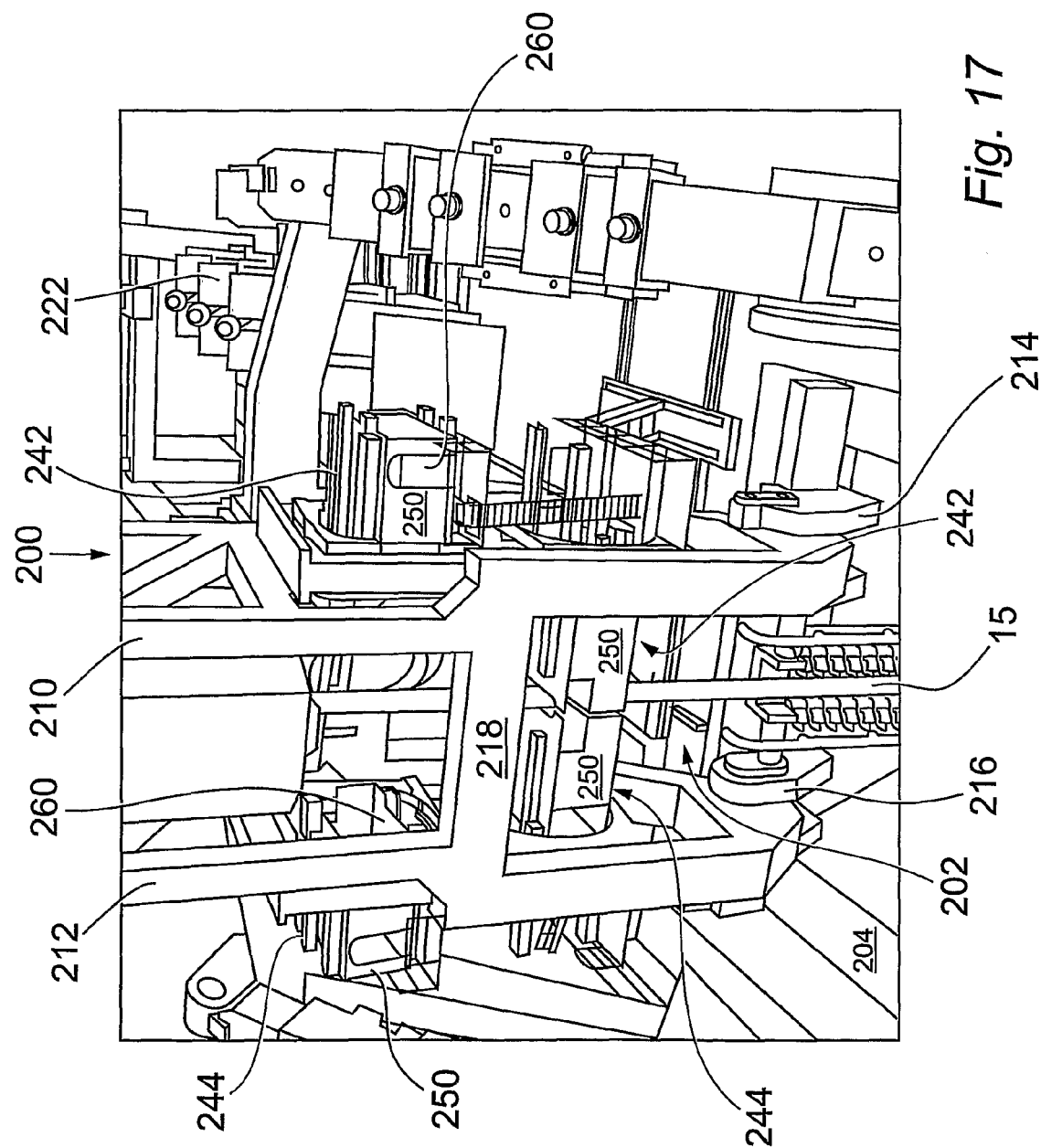

METHOD AND APPARATUS FOR LAYING A MARINE PIPELINE

CROSS REFERENCE TO RELATED APPLICATION

The present application is a 35 U.S.C. §§371 national phase conversion of PCT/PCT/GB2008/000366, filed Feb. 4, 2008, which claims priority of English Application No. 0702161.1, filed Feb. 5, 2007, the disclosure of which is incorporated by reference herein. The PCT International Application was published in the English language.

BACKGROUND OF THE INVENTION

The present invention relates to a method and apparatus for laying a marine pipeline, in particular to a method and apparatus for installing accessories on the end of a pipeline and/or at one or more intermediate locations along the pipeline.

Marine pipelines for conveying gas or crude oil are typically laid from specialised pipelaying vessels or barges, whereby pipelines are deployed and lowered to the seabed in a controlled fashion, the pipelines either being assembled from individual pipe sections on the vessel (referred to as "stovepiping") or spooled from one or more reels mounted on the vessel (referred to as "reel pipelaying").

The stovepiping method requires the pipelaying operation to be periodically halted to permit additional pipe sections to be welded to the pipeline and also requires many experienced welders and additional welding equipment to be carried on the vessel, working in difficult conditions. Therefore stovepiping is a relatively slow and difficult process.

By contrast, reel pipelaying, wherein the pipeline can be prefabricated onshore and spooled onto a large reel, reduces the labour requirements onboard the vessel and considerably speeds up the pipelaying operation. However, a requirement of the reel pipelaying method is to provide means for straightening and guiding the pipeline as it leaves the reel, typically by means of series of rollers or tracks that impart sufficient reverse bending force to remove residual curvature from the pipeline and guides the pipeline into the water at an angle optimised to reduce bending stresses.

For both stovepiping and reel pipelaying, there are two main methods of guiding the pipeline from the vessel, namely S-lay and J-lay.

According to the S-lay technique, the pipeline is passed over guide means as it leaves the vessel so that it is made to follow an S-shaped path with a very large radius of curvature so as to prevent any plastic deformation. The pipe leaves the vessel at a very oblique angle, with the aid of an inclined arcuate ramp known as a stinger. This technique is suited only to shallow and moderate laying depths because otherwise the weight of the pipeline already laid would run the risk of bending and plastically deforming the pipe at the point where it leaves the stinger. In order to lay pipeline at greater depth it is necessary to increase the pipeline water entry angle.

According to the J-lay technique, the pipeline is guided down a vertical or steeply inclined ramp on the laying vessel so that the pipeline leaves the vessel substantially vertically, whereby the pipeline can immersed to a great depth, still without plastic deformation. Thus the J-lay technique is suited to laying pipeline in deep water.

WO 93/06401, WO 93/06402 and WO 95/22484 disclose known pipelaying vessels provided with a pipe take-off assembly mounted adjacent to the stern of the vessel. The take-off assembly includes a pipe take-off or guide ramp which contains straightening and tensioning devices as well as additional pipe clamping means. The take-off ramp is rotatably journalled to permit adjustment of the inclination of the ramp to permit variation of the pipeline water entry angle from about 20° to about 90° for laying pipeline from depths as shallow as 60 metres to much greater depths. The upper part of this range, from about 60° to about 90°, can be used for deep-water laying in 1,000 metres and greater depths.

Thus the vessels can be used to lay pipeline from a reel onto the seabed at a wide range of depths.

During a pipelaying operation it is necessary to attach accessories to the ends of the pipeline and/or at one or more intermediate locations along the pipeline. These accessories are usually quite large and heavy and are commonly designed to be welded to an end of the pipeline, requiring interruption of the laying of the pipeline. Examples of such accessories are initiation fittings, pipeline end terminations (PLETs), pipe valves and tee assemblies.

A problem with such accessories, particularly with the reel pipelaying method, is that they will not readily pass over the take off ramp and thus cutting of the pipeline and installation of the accessory must normally be done downstream of the take off ramp, requiring clamping of the end of the pipeline and halting of the pipelaying operation (and halting of movement of the pipelaying vessel) while the accessory is installed. Various prior art solutions are known to mount an accessory at the end of a pipeline or at an intermediate location in or on a pipeline, such as those shown in WO03/067019, WO 2006/089786 and WO 2006/054891, although each have disadvantages, in particular requiring a considerable interruption to the pipelaying operation while the pipeline is cut and the accessory is moved into position and connected to the end of the pipeline.

For example in WO 03/067019 a system for introducing an inline accessory into a pipeline is described. The pipelaying system comprises a pipeline spool, a tensioner and a clamp, usually referred to as "hang-off" clamp. The hang-off clamp is adapted to hold the end of the pipeline and support the weight of the launched pipeline while the accessory is moved into position and connected to the pipeline.

The tensioner is mounted on a take off or launch ramp, having variable inclination. The hang-off clamp is capable of translating horizontally, while the launched pipeline is suspended therefrom, between a pipeline feeding position beneath the launch ramp and an accessory connection position spaced to one side of the feeding position. Means are provided for lowering the pipeline and accessory connected thereto past the clamp.

The need to laterally translate the hang-off clamp increases the risk of dropping the end of the pipeline, requires complex actuating mechanisms that must operate in adverse conditions while supporting the weight of the pipeline and thus exposed to heavy loads and causes substantial delay in the pipelaying operation when an accessory needs to be connected to the pipeline.

SUMMARY OF THE INVENTION

According to a first aspect of the present invention there is provided an apparatus to be mounted on a vessel for a laying a marine pipeline having accessories on the end of the pipeline and/or at one or more intermediate locations along the pipeline, said apparatus comprising a pipeline launch ramp having pipeline guide means for guiding and controlling the movement of a pipeline along a pipeline firing line in the direction of the seabed, pipeline clamping means downstream of the guide means for selectively clamping and supporting the launched pipeline, wherein said launch ramp is provided with an opening downstream of said guide means and upstream of said clamping means for passage of an accessory between a storage position and an installation location in the pipeline firing line to allow the accessory to be connected to an end of the pipeline supported by said clamping means. Preferably said storage position of the accessory is inboard of the launch ramp.

Preferably said clamp means is moveable between an operative position, wherein the clamping means lies in the pipeline firing line, and a retracted position, wherein said clamping means is moved out of said pipeline firing line to permit passage of an accessory therepast.

Preferably the launch ramp is pivotally mountable on the vessel to permit the angle of inclination of the launch ramp to be varied to vary the water entry angle of the pipeline.

In one embodiment, said launch ramp comprises a pair of spaced apart substantially parallel elongate frame members, mountable upon the vessel in cantilever fashion, said opening being provided between said elongate frame members, below said guide means and above the clamping means. Preferably said elongate frame members are pivotally mountable on the vessel to allow the angle of inclination of the launch ramp to be varied. Preferably the clamping means is pivotally mounted on a pivot axis aligned with the pivot axis of each of the elongate frame members when the clamping means is in its operative position.

Preferably the apparatus is further provided with at least one work station having at least one work platform located in or adjacent said opening in the launch ramp, said work station being movable between an operative configuration wherein the at least one work platform is located in the pipeline firing line for allowing cutting and welding operations to be carried out on the pipeline, and a retracted configuration to permit passage of an accessory through said opening and into its installation location for connection to the pipeline. Preferably the apparatus is provided with a plurality of such work stations spaced apart along the pipeline firing line.

Preferably the or each workstation comprises a pair of work platforms arranged on opposite sides of the pipeline firing line.

Where the launch ramp is pivotally mountable on the vessel to permit the angle of inclination of the launch ramp to be varied to vary the water entry angle of the pipeline, the or each work station, or at least the or each work platform provided thereon, may be pivotally or rotatably mounted to permit the work platform to remain horizontal at all times during variation of the angle of inclination of the launch ramp.

The or each work platform of at least one of said workstations, preferably the work station closest to the guide means, may be moveable between its first and second configurations independently of the or each work platform of any other work stations.

The or each work platform of said at least one work station is preferably moveable in a direction transverse to the normal direction of travel of the accessory through said opening. Said at least one work platform may also be moveable in a direction parallel to the pipeline firing line.

In a preferred embodiment, the apparatus is provided with an upper work station for welding an end of a pipeline to an upper region of an accessory and a lower work station for welding an end of a pipeline to a lower region of an accessory. Preferably the or each work platform of said upper work station and the or each work platform of said lower work station are independently moveable between operative and retracted configurations. One or more further, intermediate work stations may be provided between said upper and lower work stations for further operations, such as installing anodes. The or each work platform of said one or more intermediate work stations may be moveable with those said lower work station.

The or each work platform may be provided with an enclosure for protecting any persons working therein from environmental conditions. The or each work platform and/or its respective enclosure may be moveable between a first position wherein the work platform is located within said enclosure and a second position wherein said work platform is located outside of said enclosure to allow crane access to the work platform.

The or each work station, or at least the or each work platform provided thereon, may be pivotally mounted to permit the work platform to remain horizontal at all times during variation of the angle of inclination of the launch ramp. The or each work station may be mounted either on the launch ramp or on the clamping means or on an intermediate support structure.

In one embodiment said one or more work stations may be mounted on a transverse beam extending between the elongate frame members, above said opening. Said one or more work stations may comprise at least one work platform mounted on a support member, said support member being slideable along said transverse beam for movement of said at least one work platform between said operative and retracted configurations. Preferably said one or more work stations comprise a first support member mounted on said transverse beam on one side of the pipeline firing line and a second support member mounted on said transverse beam on a second side of the pipeline firing line opposite said first side, one or more first work platforms being mounted on said first support member and one or more second work platforms being mounted on said second support member, each work station being defined by one first work platform and one second work platform, each of said first and second support members being slidable along said transverse beam for movement of said first and second work platforms between said operative and retracted configurations.

In an alternative embodiment, where said launch ramp comprises first and second spaced apart substantially parallel elongate frame members, mountable upon the vessel in cantilever fashion, said one or more work stations may each comprise a first work platform mounted on said first elongate frame member on one side of the pipeline firing line and a second work platform mounted on said second elongate frame member on a second side of the pipeline firing line opposite said first side, each of said first and second work platforms being moveable with respect to the respective frame member between said operative and retracted configurations. Preferably each of said first and second work platforms is rotatably mounted with respect to the respective frame member upon which it is mounted to permit the work platform to remain horizontal at all times during variation of the angle of inclination of the launch ramp. Each of said first and second work platforms may be axially movable with respect to the respective frame member upon which it is mounted to enable the or each work station to be movable axially along the pipeline firing line.

The apparatus may further comprise guide means, such as rails or tracks, for guiding an accessory between its storage position and installation location, at least one portion of said guide means extending from the opening of the launch ramp to be aligned with or parallel to said longitudinal axis of the vessel when mounted thereon, through said opening in the launch ramp. Further portions of the guide means may be extended transverse to said at least one portion of the guide means for guiding accessories from respective storage positions into intermediate transport positions for subsequent movement along said at least one portion of the guide means to said installation location. Each accessory may be mounted on a sled or carriage, moveable along said guide means. Preferably each accessory is mounted on its respective carriage at an angle substantially corresponding to the normal angle of inclination of the launch ramp. Said carriage may be provided with means for altering the angle of inclination at which the accessory is mounted thereon. In an alternative embodiment the means for altering the angle of inclination and of obtaining fine alignment of the pipe ends may be fitted within the opening of the pipelay launch ramp.

According to a second aspect of the present invention there is provided a pipelaying vessel for a laying a marine pipeline having accessories on the end of the pipeline and/or at one or more intermediate locations along the pipeline, said vessel having mounted thereon a pipeline launch ramp having pipeline guide means for guiding and controlling the movement of a pipeline along a pipeline firing line in the direction of the seabed, pipeline clamping means downstream of the guide means for selectively clamping and supporting the launched pipeline, wherein said launch ramp is provided with an opening downstream of said guide means and upstream of said clamping means for passage of an accessory between a storage position and an installation location in the pipeline firing line to allow the accessory to be connected to an end of the pipeline supported by said clamping means.

Preferably the launch ramp is pivotally mounted on the vessel to permit the angle of inclination of the launch ramp, and thus the water entry angle of the pipeline, to be varied.

In a preferred embodiment the launch ramp is provided at the stern of the vessel or over a moon pool provided in the vessel, the pipeline firing line laying in a vertical plane aligned with or substantially parallel to the longitudinal axis of the vessel, whereby an accessory can pass through said opening in the launch ramp is a direction substantially aligned with or parallel to said longitudinal axis of the vessel.

According to a further aspect of the present invention there is provided a method of laying a marine pipeline having accessories on the end of the pipeline and/or at one or more intermediate locations along the pipeline, said method comprising the steps of:— guiding the pipeline along a guide means provided on a launch ramp provided on a pipeline laying vessel to lay the pipeline from the laying vessel along a pipeline firing line;

suspending the pipeline from a clamping means downstream of the guide means;

cutting the pipeline upstream of the clamping means;

moving an accessory through an opening provided in the launch ramp upstream of the clamp means and downstream of the guide means from an inboard position to an installation location in the pipeline firing line;

connecting said accessory to an end of the pipeline suspended by the clamping means;

releasing the clamping means and laying the pipeline and connected accessory from the vessel.

Preferably the apparatus is further provided with at least one work station having at least one work platform located in or adjacent said opening in the launch ramp, said method including the further step of moving said work station from a first or operative configuration wherein the at least one work platform is located in the pipeline firing line for allowing cutting and welding operations to be carried out on the pipeline, to a second or retracted configuration before moving the accessory through said opening and into its installation location for connection to the pipeline.

BRIEF DESCRIPTION OF THE DRAWINGS

Embodiments of the present invention will now be described, by way of example only, with reference to the accompanying drawings, in which:—

FIG. 17 is a further perspective view of the pipe laying apparatus of FIG. 16.

DESCRIPTION OF THE PREFERRED EMBODIMENT

Figure 1:
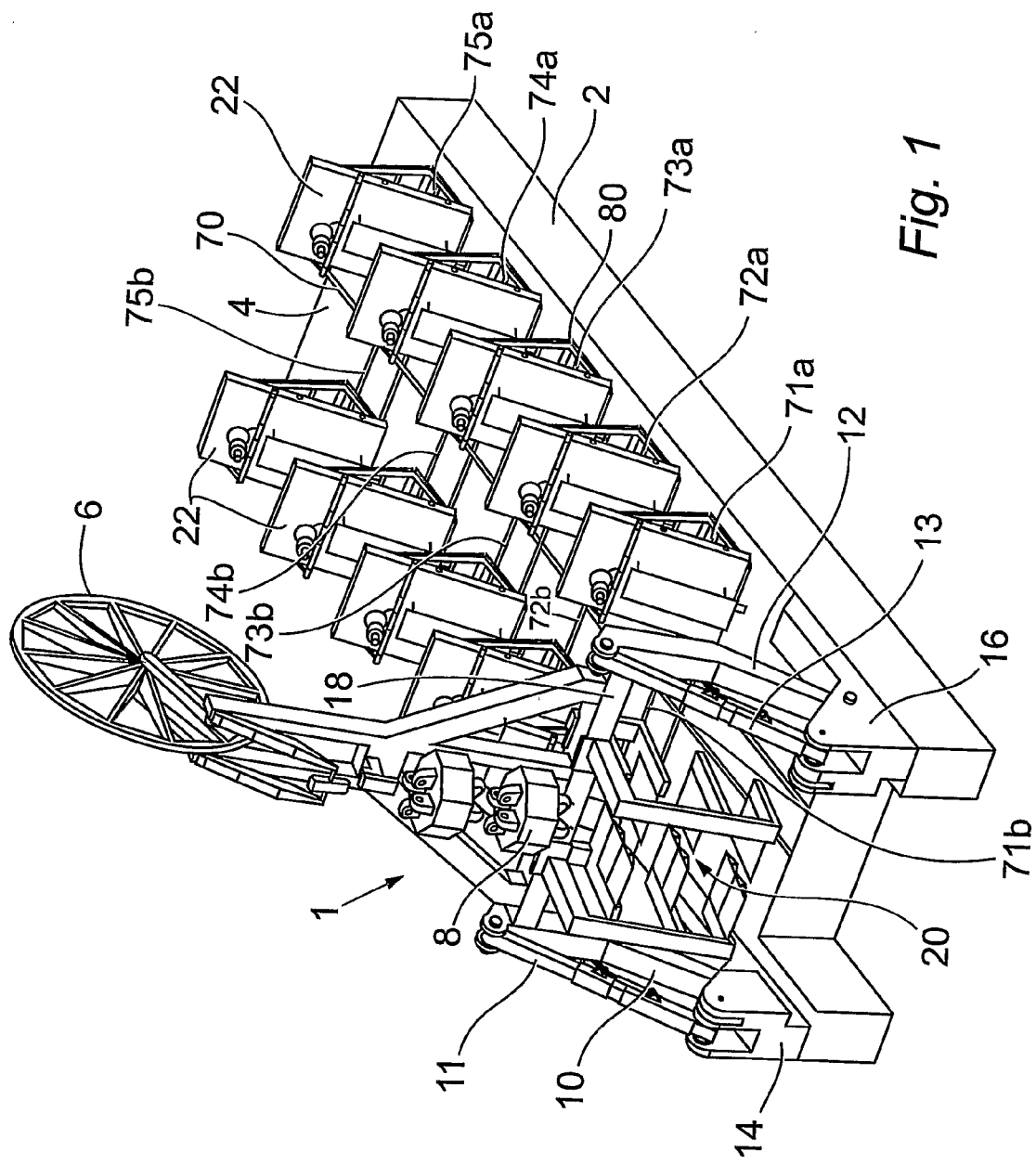
FIG. 1 is a perspective view of a pipe laying vessel having a pipe laying apparatus according to a first embodiment of the present invention.
Figure 2:
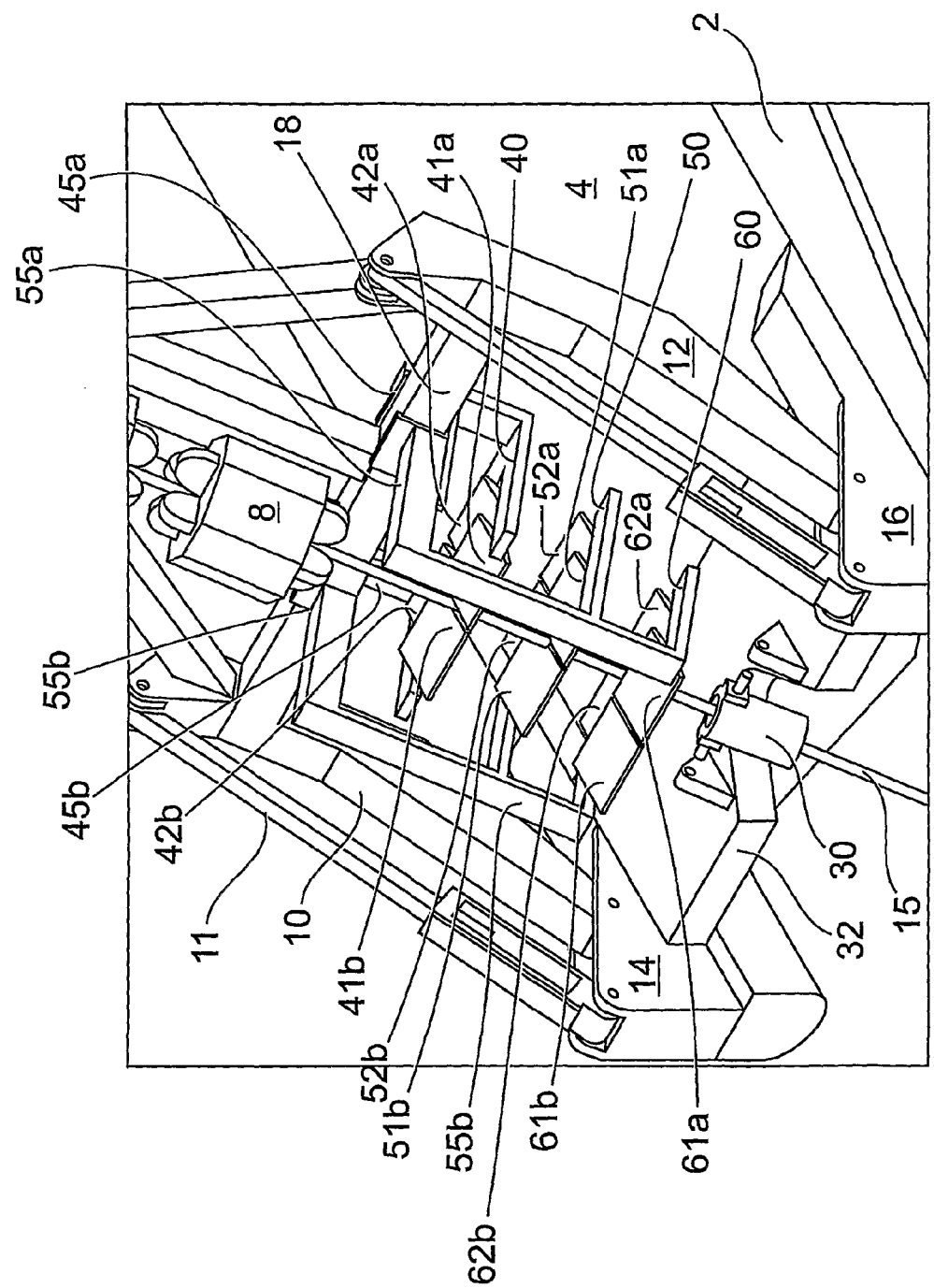
FIG. 2 is a perspective view of the pipe laying apparatus of FIG. 1.
Figure 3:
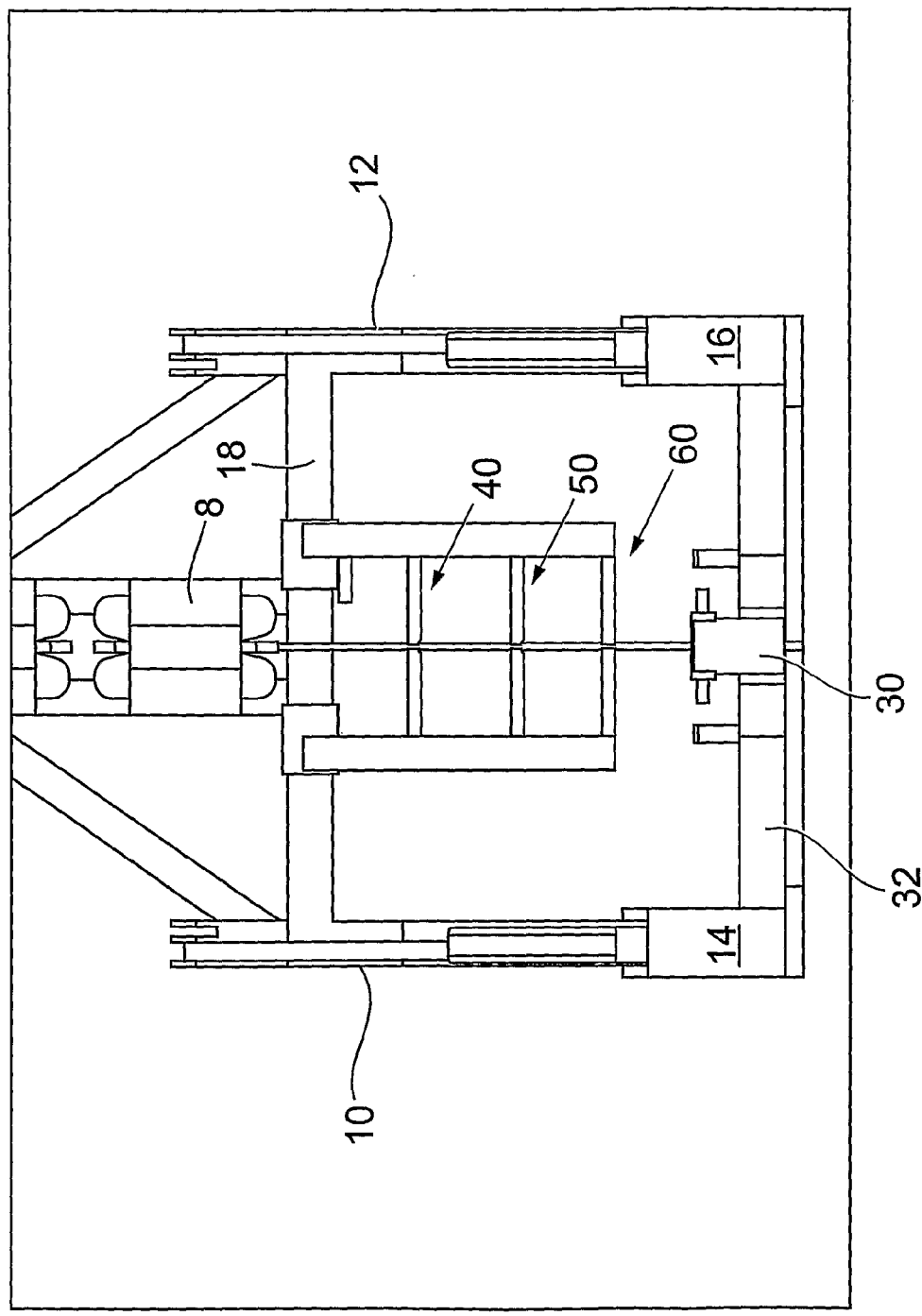
FIG. 3 is an end view of the pipe laying apparatus of FIG. 1.
Figure 4:
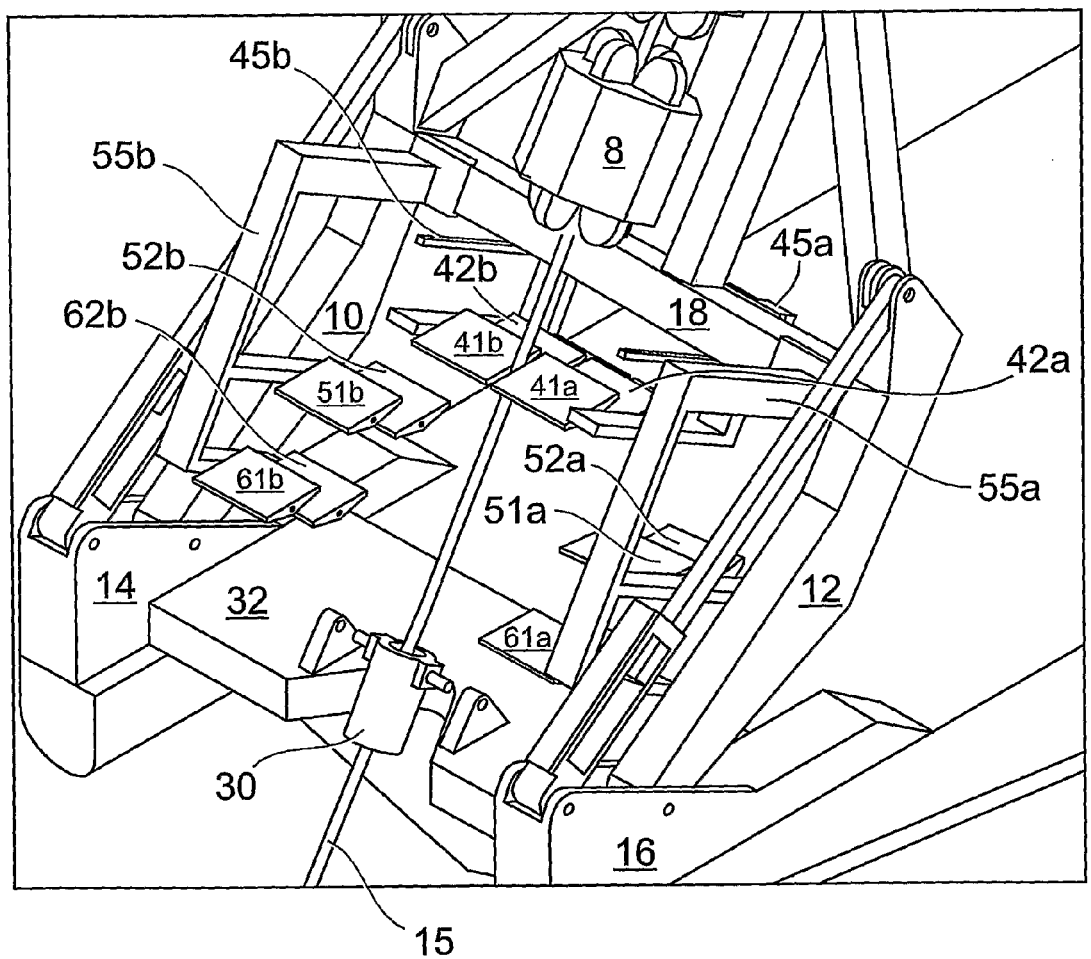
FIG. 4 is a perspective view of the pipe laying apparatus of FIG. 2 showing the lower work stations in their retracted configuration.
Figure 5:
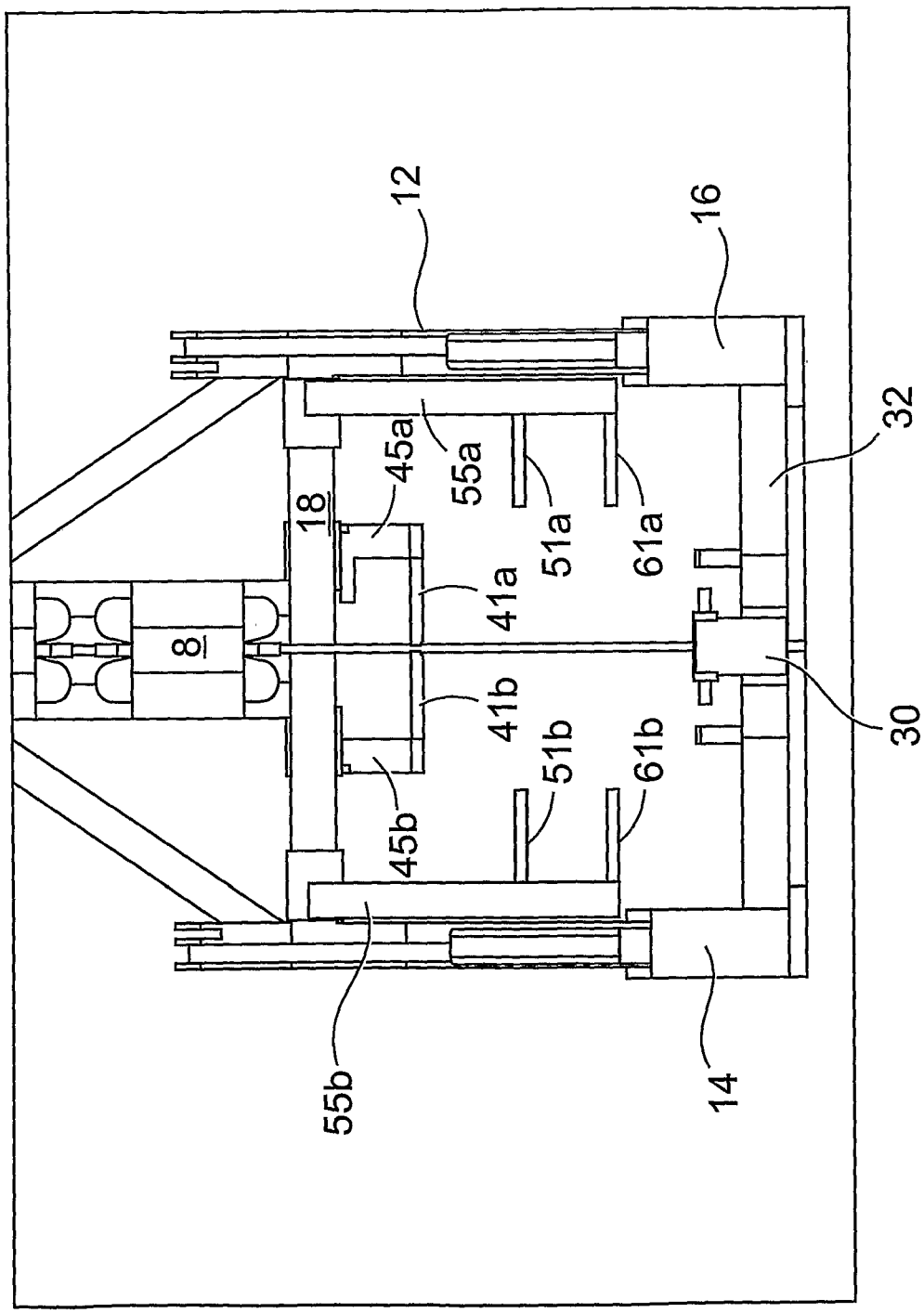
FIG. 5 is an end view of the apparatus shown in FIG. 4.

As illustrated in FIGS. 1 to 10, a pipe laying apparatus according to a first embodiment of the present invention includes a launch ramp 1 mounted at the stern of a vessel 2 and having pipeline guide 6 and tensioning means 8 provided thereon.

The launch ramp 1 comprises a pair of spaced elongate frame members 10,12, each frame member being pivotally connected at a lower end to a base member 14,16 mounted on the vessel 2 such that the frame members 10,12 extend upwardly from either side of the deck 4 of the vessel 2 adjacent the stern. A transverse beam 18 joins the upper ends of the frame members 10,12 to define a goal post like arrangement having an opening 20 between the frame members 10,12 and below the transverse beam 18 through which an accessory 22, such as an initiation fitting, a pipeline end termination (PLET), a pipe valve or a tee assembly can pass.

Figure 6:
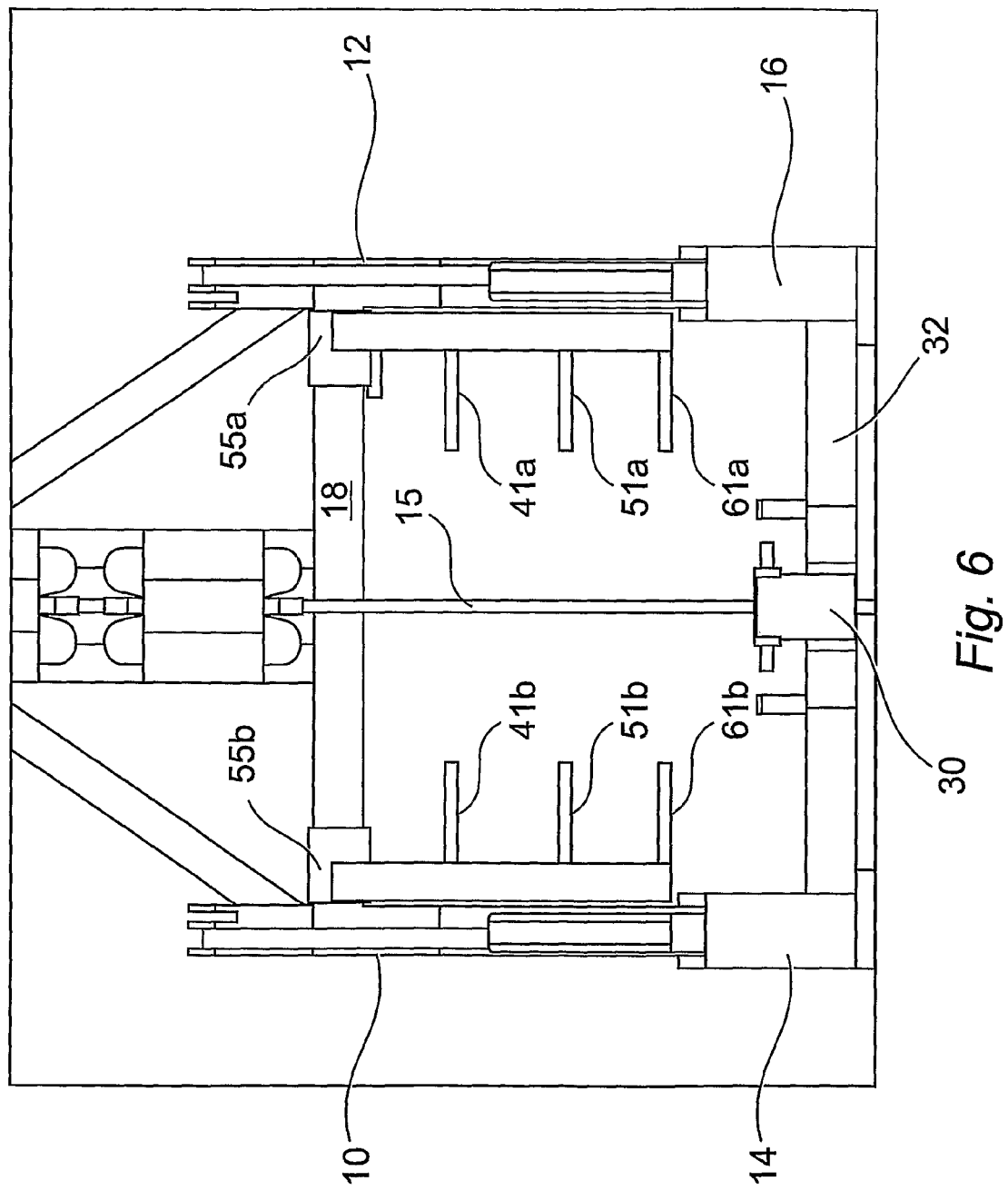
FIG. 6 is an end view of the apparatus of FIG. 4 showing all work stations in their retracted configuration.
Figure 7:
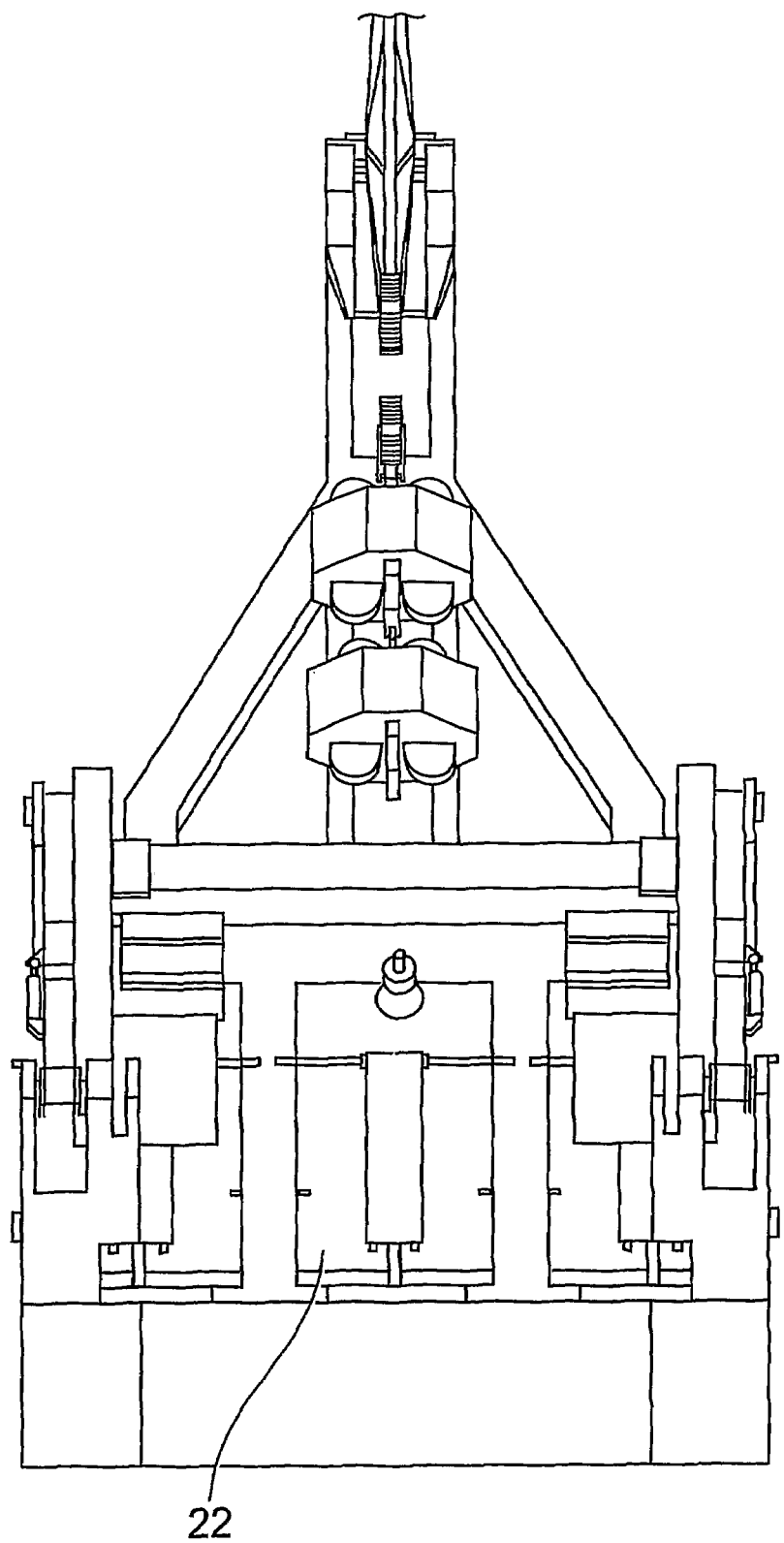
FIG. 7 is an end view of the pipe laying apparatus of FIG. 1 showing the passage of an accessory through the opening in the launch ramp.
Figure 8:
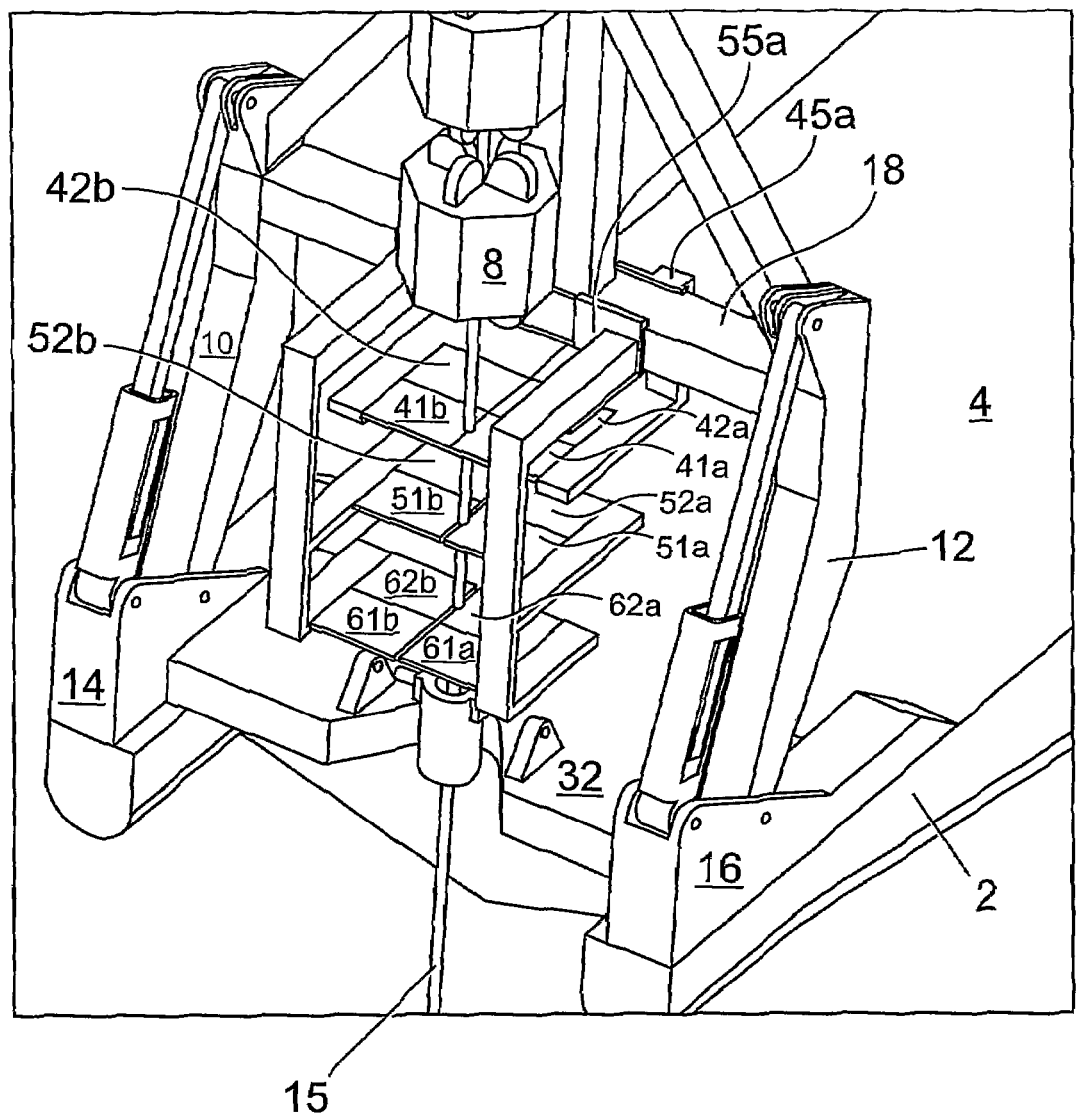
FIG. 8 is a perspective view of the apparatus of FIG. 1 showing the launch ramp in its fully upright position.
Figure 9:
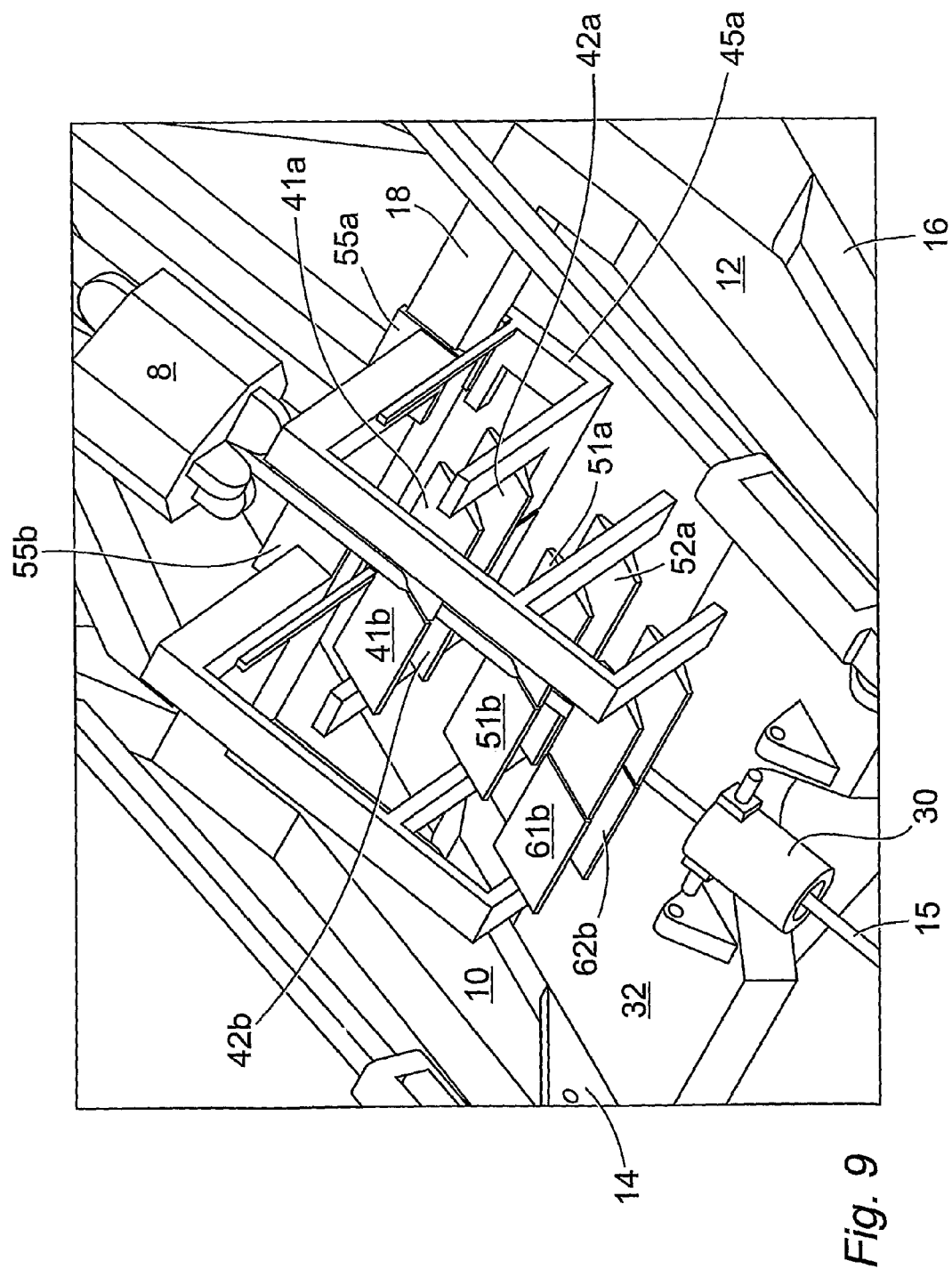
FIG. 9 is a perspective view of the apparatus of FIG. 1 showing the launch ramp in its lowermost or fully inclined position.
Figure 10:
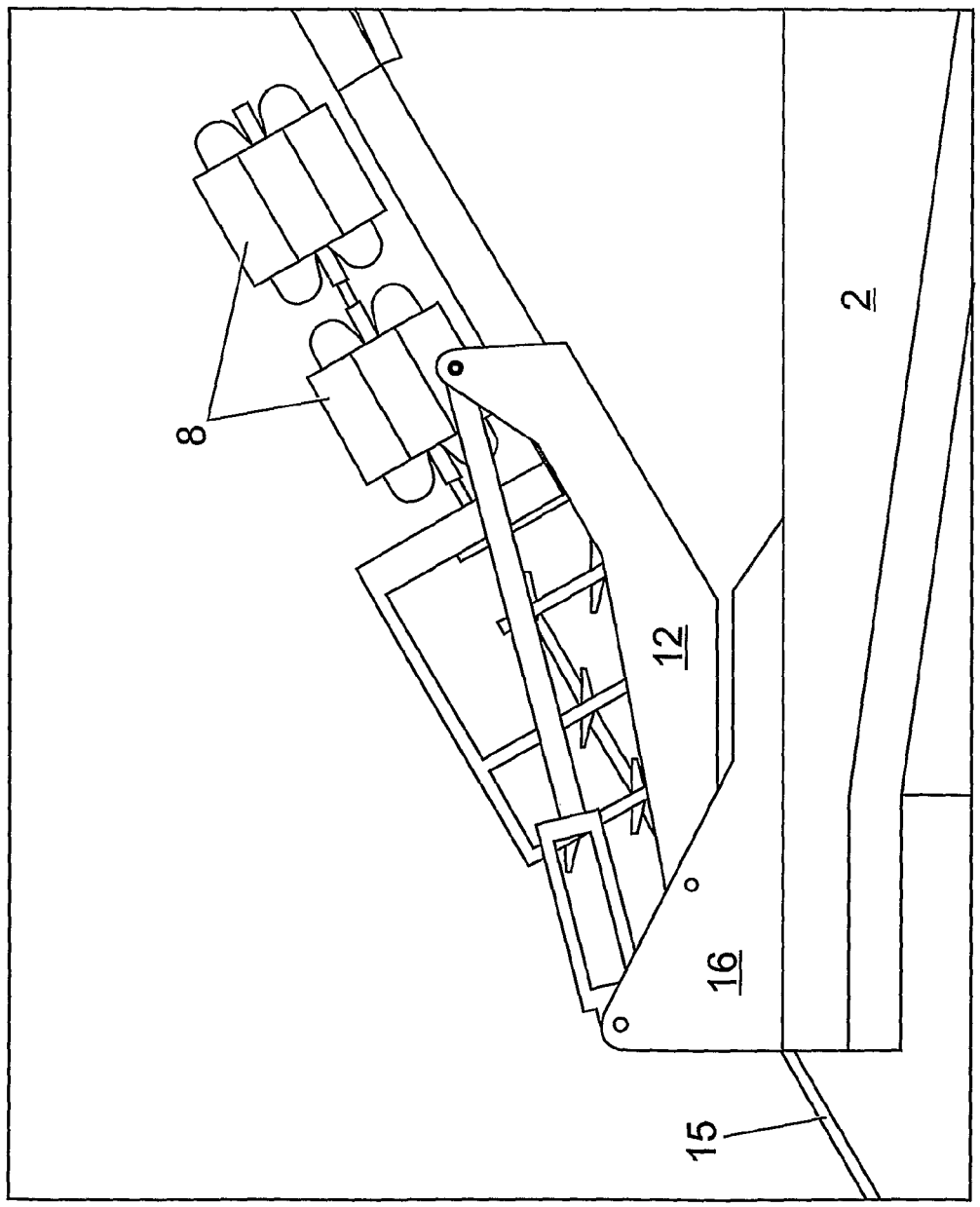
FIG. 10 is a side view of the apparatus of FIG. 1 showing the launch ramp in its lowermost position.

A hydraulic adjuster comprised of one or more hydraulic rams 11,13 is associated with each frame member 10,12 to enable the angle of inclination of the launch ramp 1 to be varied to this vary the water entry angle of the pipeline 15 to suit pipe laying operations at different depths. It is envisaged that the inclination of the launch ramp 1 may be varied to vary the pipeline water entry angle between 20° to about 100°. In the preferred embodiment, the shape of the frame members 10,12 and the associated base members 14,16 are adapted such that each frame members 10,12 rests upon the respective base member 14,16 with the launch ramp at a minimum inclination angle to provide a minimum pipeline water entry launch angle of 30°, as shown in FIGS. 9 and 10. The maximum pipeline water entry angle is approx 90°, as shown in FIG. 6. The launch angle may be extended beyond 90 degrees to enable the pipe to be laid with the vessel moving astern with the suspended pipe catenary underneath the ship so as to facilitate the hand over of the pipeline to a floating production facility by allowing a close approach.

The launch ramp 1 may be mounted for movement transversely across the deck so that the ramp can be maintained directly in line with the pipeline as it comes off a horizontally journalled reel mounted on the vessel. To accommodate the movement of the pipeline across the reel as it is unwound, the ramp may be moveable either side of the centreline of the vessel so that the ramp centreline moves across the width of the reel.

Extending upwardly from the transverse beam 18, the remainder of the launch ramp 1 defines a support structure for the pipeline guide 6 and tensioning means 8. Pipeline 15 can be supplied to the launch ramp 1 from a large reel, either vertically or horizontally arranged on the vessel. Alternatively the pipeline may be assembled from individual pipe sections on the vessel and fed to the launch ramp.

Beneath the launch ramp 1, a hang-off clamp 30 is provided for clamping and supporting an end of the pipeline 15 to allow the pipeline 15 to be cut for the connection of an accessory 22 thereto.

Three vertically spaced work stations 40, 50, 60 are suspended below the transverse beam 18 of the launch ramp 1 to permit operations such as welding an anode installation operations to be carried out on the pipeline 15. Each work station 40, 50, 60 comprises first and second pairs of platform sections 41a, 41b, 42a, 42b, 51a, 51b, 52a, 52b, 61a, 61b, 62a, 62b mounted on either side of the pipeline firing line.

In order to allow an accessory 22 to pass between the elongate frame members 10,12 into an installation position wherein it can be connected to the pipeline 15, the platform sections 41a, 41b, 42a, 42b, 51a, 51b, 52a, 52b, 61a, 61b, 62a, 62b of each work station 40, 50, 60 are mounted on carriers 45a, 45b, 55a, 55b extending from and slidably mounted on the transverse beam 18 of the launch ramp 1 to be slideable transversely from operative positions on either side of the pipeline firing line to retracted positions spaced away from the pipeline firing line providing clearance for the accessory 22. The platform sections 41a, 41b, 42a, 42b of the uppermost work station 40 are mounted on separate support carriers 45a,45b, moveable independently on the transverse beam 18 to allow the platform sections 41a, 41b, 42a, 42b to be returned to their operative positions once the accessory 22 has been moved to its installation position, to allow welding and other operations to be carried out on the accessory, for example to allow the accessory 22 to be welded to the pipeline 15, upstream of the accessory 22. Each work station platform section 41a, 41b, 42a, 42b, 51a, 51b, 52a, 52b, 61a, 61b, 62a, 62b is mounted on its respective carrier for rotation about a horizontal axis parallel to the transverse beam whereby each platform section can be maintained in a horizontal orientation regardless of the angle of inclination of the launch ramp 1, such that each platform section is self-levelling.

The hang-off clamp 30 is mounted on a retractable support 32 to allow the hang-off clamp 30 to be moved between an operational position, aligned with the pipeline firing line, and a retracted position, wherein the hang-off clamp 30 is retracted out of the pipeline firing line to allow an accessory to move past the hang-off clamp. In order to maintain the hang-off clamp 30 co-axial with the pipeline firing line, the clamp 30 is mounted on its support 32 to be pivotable about a pivot axis aligned with the pivots axes of the frame members 10,12 when it its operational position. A further, lowermost work station (not shown) may be mounted or provided on the hang-off clamp support 32 to allow an accessory to be welded to the already laid pipeline 15.

The spacing between the work station platform sections when in their retracted positions and the dimensions of the frame members 10,12 and transverse beam 18 are arranged to provide sufficient clearance to allow passage of an accessory, such as a PLET, of up to 8 m×14 m×6 m.

In order to transport accessories from a storage position on the deck 4 of the vessel 2 to the installation position in the pipeline firing line, guide tracks are provided along the deck 4 of the vessel 2, a first elongate track section 70 extending along the centre line of the vessel 2, extending through the opening 20 between the frame members 10,12 of the launch ramp 1 to the accessory installation position. Extending transversely from the first track section 70 are a plurality of further track sections 71a, 71b, 72a, 72b, 73a, 73b, 74a, 74b, 75a, 75b extending to individual accessory storage positions located at spaced locations along either side of the deck 4 of the vessel 2. Each accessory 22 is mounted on a carriage 80 whereby the accessory 22 can be moved from its respective storage location along its respective further track section, the carriage 80 then being moveable along the first track section 70 to the installation position.

Each accessory 22 is mounted on its carriage 80 at an inclination substantially corresponding to the expected pipeline water entry angle. Means may be provided for varying the angle at which the accessory 22 is mounted on the carriage 80 so that the angle can be adjusted to correspond to the angle of inclination of the launch ramp. The carriage 80 may be provided with accessory handling means, such as manipulator arms, whereby the orientation and position of the accessory 22 can be adjusted to bring the accessory 22 into alignment with a pipeline 15 to which it is to be connected when in its installation position.

An abandonment and recovery line, also known as Laydown and Recovery line (not shown), is provided on a winch adjacent the hang-off clamp 30. The A&R line is used to lay the end of the pipeline 15, and any accessory associated therewith, down on the seabed and to recover the pipeline/accessory, if required. The capacity of the A&R line is matched to the lay system capacity and the length of line is matched to the length of the catenary in the deepest water in which the ship is designed to operate.

By bringing the accessory directly into the pipeline firing line at the correct location and orientation for connection to the pipeline, without requiring movement of the hang-off clamp or launch ramp, the delay to the pipelaying operation required for installation of an accessory to the pipeline is minimised.

Pipelaying vessels must operate in harsh environmental conditions and therefore it is desirable to provide a protective enclosure at each work station to enable welding operations to be carried out in a sheltered environment. In a second embodiment of the present invention, as illustrated in FIGS. 11 to 15, each work station is defined by a pair of enclosures 110 within which is respectively mounted each platform section 120 to provide a shelter around each work station.

Figure 12:
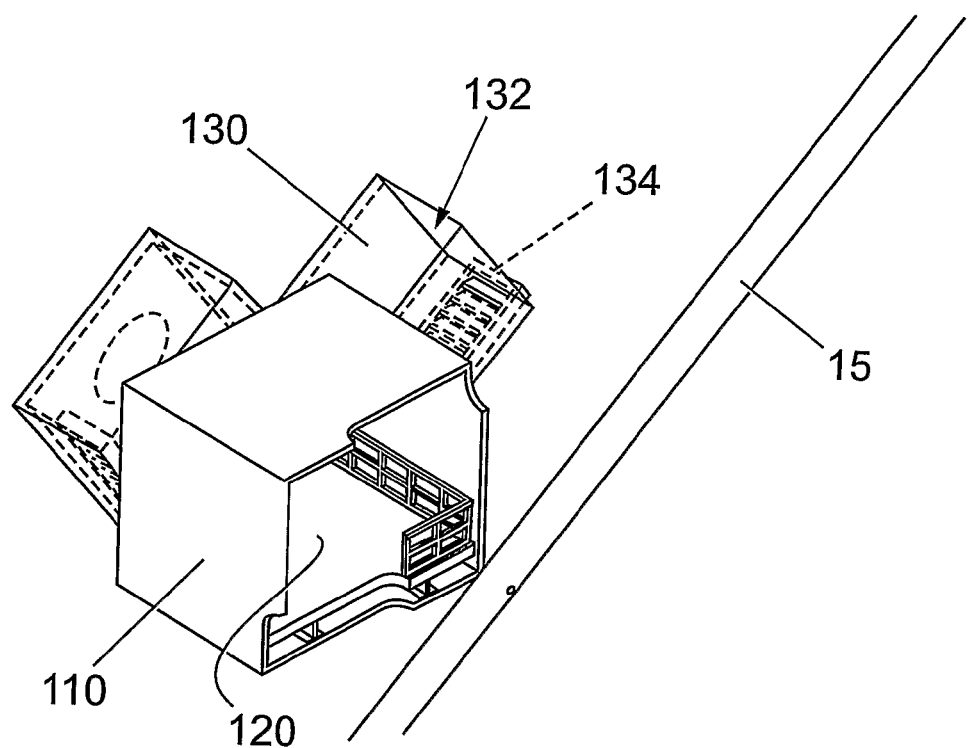
FIG. 12 is a further view of the pipe laying apparatus of FIG. 11 showing the work station in a retracted configuration.
Figure 13:
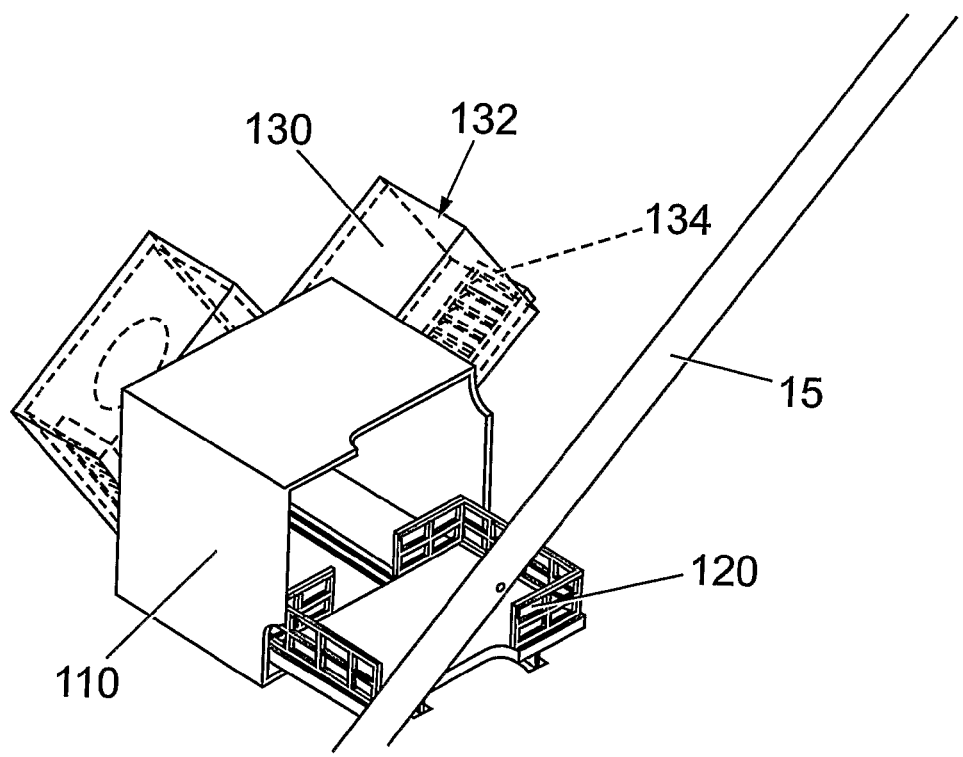
FIG. 13 is a further view of the pipe laying apparatus of FIG. 11 showing the work platform of the work station in an operative or extended position.

Each platform section 120 is slideably mounted within the respective enclosure 110 to be moveable between a retracted position, as shown in FIG. 12, wherein persons working on the platform section are protected from the environment, and an extended position, as shown in FIG. 13, wherein the platform section 120 is accessible, for example to enable objects to be delivered to the platform via a crane.

Figure 11:
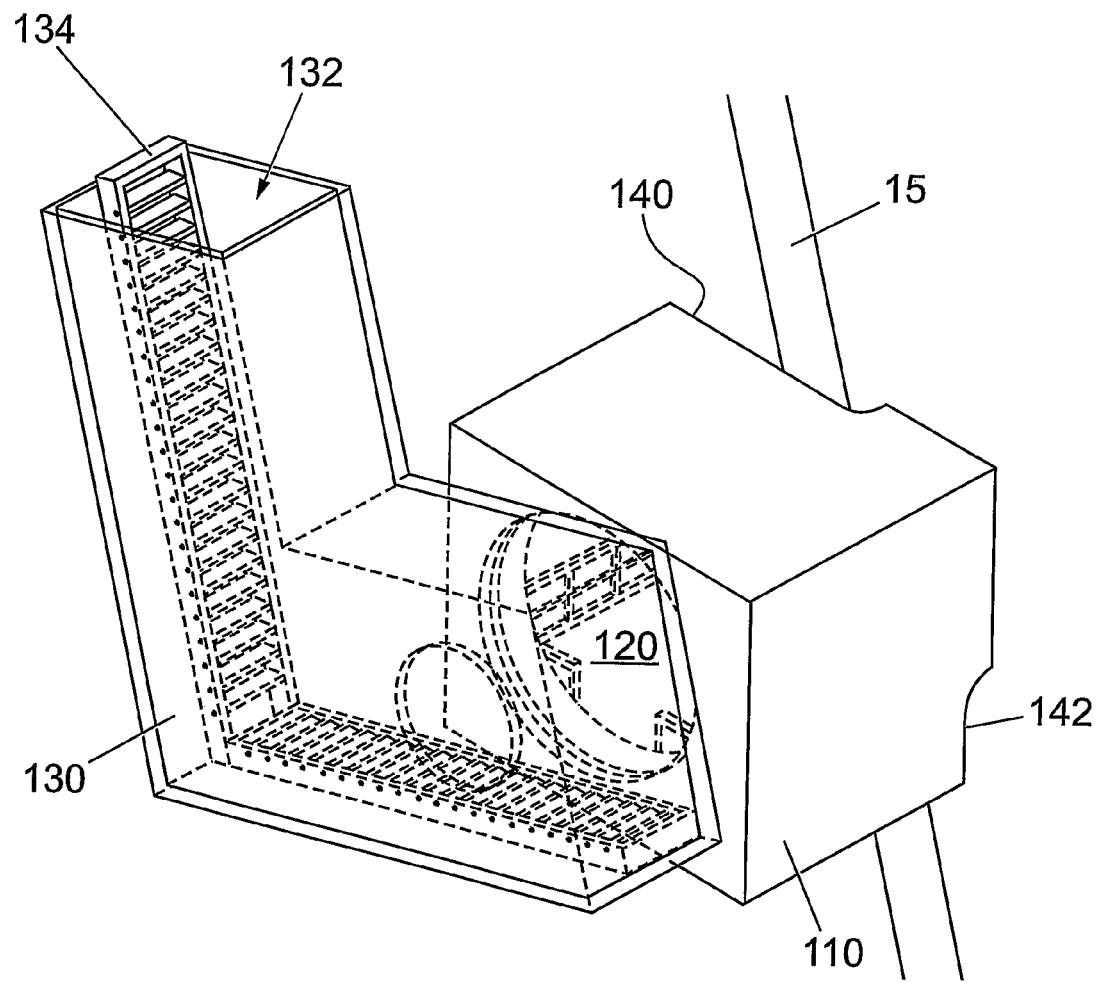
FIG. 11 is part perspective view of a work station of a pipe laying apparatus according to a second embodiment of the present invention.

As with the first embodiment, each platform section 120 is rotatable about a horizontal axis whereby each platform section 120 can be maintained in a horizontal orientation regardless of the angle of inclination of the launch ramp, such that each platform section 120 is self-levelling. As shown in FIG. 11, each enclosure 110 is journalled for rotation with respect to a carrier 130 mounted below the transverse beam of the launch ramp (omitted for clarity). Each carrier 130 comprises hollow box like structure, the interior 132 of the carrier 130 defining an enclosed access passageway providing passage to the respective enclosure and the platform sections mounted therein. Stairway ladders 134 are mounted within each carrier 130 to allow persons to move therein regardless of the orientation of the launch ramp.

Window openings, which may be glazed if desired, may be provided in the walls of the carriers 130 and/or the enclosures 110 to provide natural lighting and to provide a visual level reference to person working therein.

Figure 14:
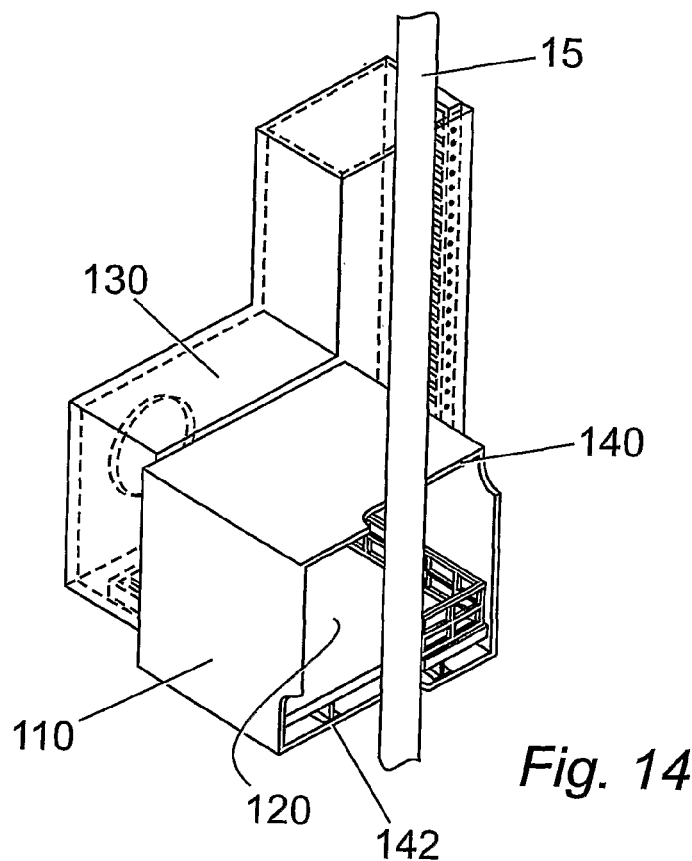
FIG. 14 is a further view of the pipe laying apparatus of FIG. 11 showing the work station in an operative configuration with the launch ramp in its fully upright position.
Figure 15:
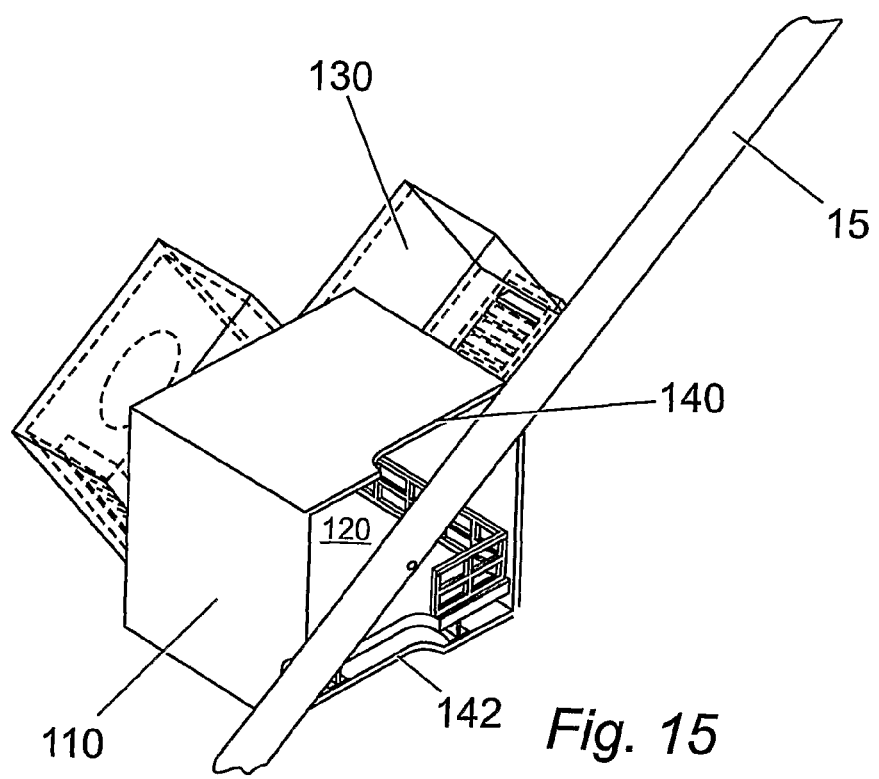
FIG. 15 is a further view of the pipe laying apparatus of FIG. 11 showing the work station in an operative configuration with the launch ramp in an inclined position.

As illustrated in FIGS. 14 and 15, cutouts 140,142 are provided in the upper and lower walls of each enclosure 110 to allow the pipeline 15 to pass through the enclosure 110 at each angle of inclination of the launch ramp.

Figure 16:
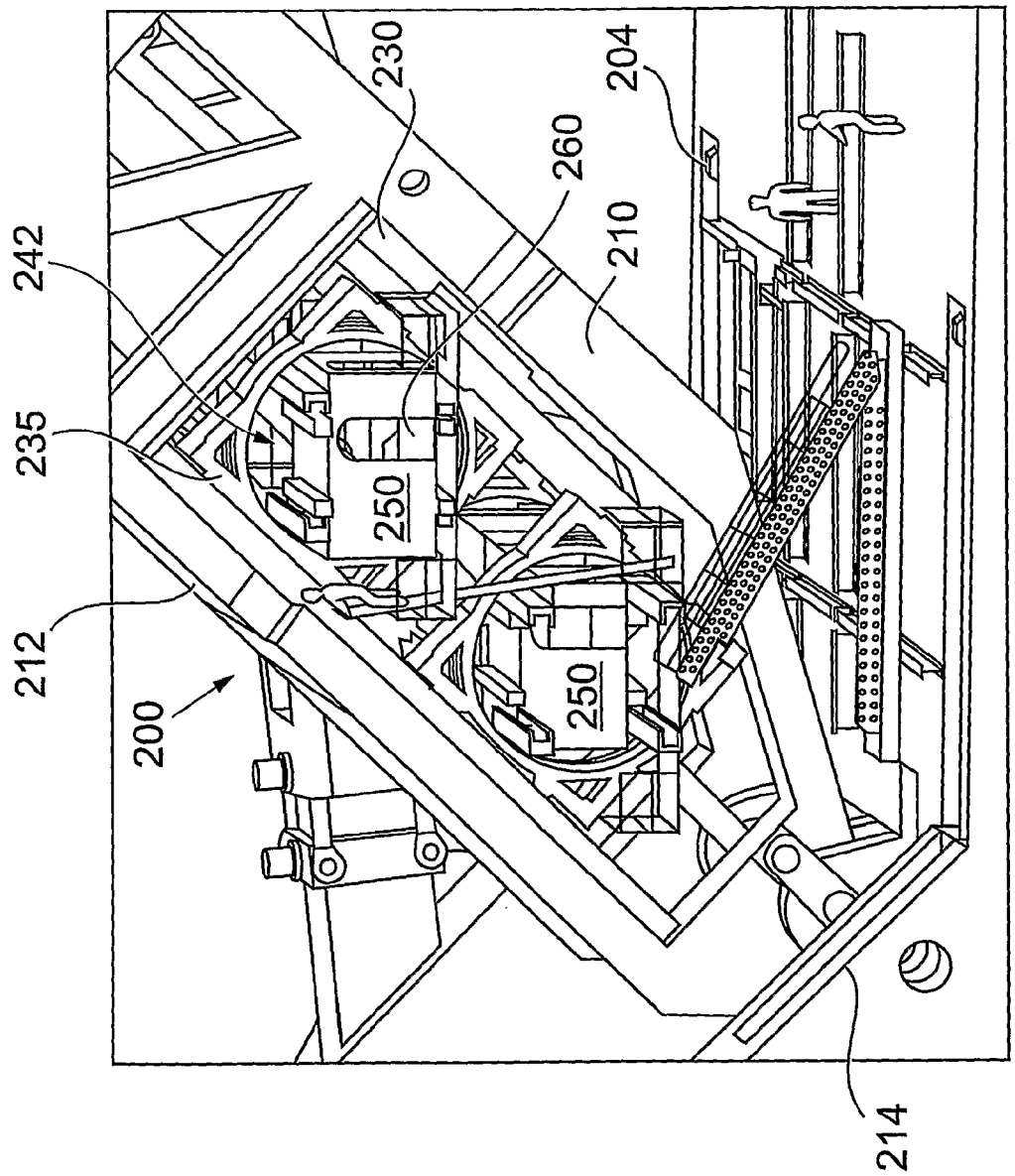
FIG. 16 is a perspective view of a pipe laying apparatus according to a third embodiment of the present invention.

In a third embodiment of the present invention, as illustrated in FIGS. 16 and 17, the work stations are mounted directly on the sides of the launch ramp.

As with the first and second embodiments, the launch ramp 200 comprises first and second spaced elongate frame members 210,212 linked by at least one transverse beam 218, each frame member 210,212 being pivotally connected at a lower end to a base member 214,216 mounted on the vessel such that the frame members 210,212 extend upwardly from either side of the deck 204 of the vessel adjacent the stern. An opening 202 is defined between the frame members 210,212 and below the transverse beam 218 through which an accessory 222, such as an initiation fitting, a pipeline end termination (PLET), a pipe valve or a tee assembly can pass.

As with the other embodiments, the launch ramp 200 may be mounted for transverse movement across the deck of the vessel whereby the launch ramp can be maintained in alignment with the pipeline as it comes off a vertically arranged reel mounted on the vessel.

As shown in FIG. 16, each of said first and second frame members 210,212 defines a box section framework having an opening 230 for receiving a pair of work station carrier members 235. Each carrier member 235 is slideably mounted within its respective opening 230 to allow the carrier member 235 to be moved in a direction parallel to the pipeline firing line to enable the height of the work stations to be adjusted.

Each work station comprises a first work station section 242 mounted in said carrier member 235 on said first frame member 210 on one side of the pipeline firing line and a second work station section 244 mounted in said carrier member 235 on said second frame member 212 on a second side of the pipeline firing line opposite the first side, the first and second work station sections 242,244 being mounted within the first and second frame members 210,212 for transverse movement towards and away from one another to be movable between an operative configuration, wherein the work station sections are located in the pipeline firing line for allowing cutting and welding operations to be carried out on the pipeline, and a retracted configuration, to permit passage of an accessory 222 through said opening 202 and into its installation location for connection to the pipeline.

Each work station section 242,244 is rotatably mounted within its respective carrier member 235 to permit the work station to remain horizontal at all times during variation of the angle of inclination of the launch ramp 200.

The work station sections 242,244 of each work station each comprises a shelter 250 comprising a box-like enclosure being closed on three sides, the shelters 250 of each work station section 242,244 of each work station cooperating when in their operative configurations to provide a substantially fully enclosed work environment around the pipeline.

Cutouts are formed in the upper and lower walls of each shelter 250 to permit passage of the pipeline therethrough, the cutouts being elongated to allow the pipeline 15 to pass through the thus formed enclosure at a variety of launch ramp inclinations. The cutouts are provided with closing means to limit the ingress of water and to maintain the environmental protection.

A platform section 260 is mounted in the bottom of each shelter 250. Each platform section 260 is movable between a retracted position, wherein the platform section 260 is enclosed within the shelter 250, and an extended position, wherein the platform section 260 is located outside of the shelter 250 to enable access to the platform section 260, for example for delivering objects to or removing objects from the platform section by crane.

By coordinating movement of each shelter 250 within the respective carrier member 235 and each platform section 260 within its respective shelter 250, three possible work station configurations are provided. In a first configuration, the shelters are moved fully inwardly to their operative positions with the platform sections in their retracted positions such that the work stations sections cooperate to form an enclosed working environment around the pipeline. In an second configuration, the shelters 250 are moved to their fully outward positions while the platform sections are moved to their extended positions, such that the platforms sections cooperate to provide an open working environment around the pipeline wherein the platform sections 260 are accessible by cranes and other load handling devices. In a third configuration, the shelters are moved to their fully outward positions and the platform sections are moved to their retracted positions whereby an unobstructed space is provided around the pipeline firing line to permit passage of an accessories such as an initiation fitting, pipeline end termination (PLETs), pipe valve or a tee assembly.

Various modifications and variations to the described embodiment of the invention will be apparent to those skilled in the art without departing from the scope of the invention as defined in the appended claims. Although the invention has been described in connection with a specific preferred embodiment, it should be understood that the invention as claimed should not be unduly limited to such specific embodiment.

The invention claimed is:

1. An apparatus to be mounted on a vessel for laying a pipeline having accessories on at least one of an end of the pipeline and one or more intermediate locations along the pipeline, said apparatus comprising:

A pipeline launch ramp having a pipeline guide for guiding and controlling the movement of the pipeline along a pipeline firing line in the direction of a seabed, A pipeline clamp downstream of the pipeline guide for selectively clamping and supporting the launched pipeline, Wherein said pipeline launch ramp is provided with an opening downstream of said pipeline guide and upstream of said pipeline clamp for passage of an accessory between a storage position and an installation location in the pipeline firing line to allow the accessory to be connected to an end of the pipeline supported by the pipeline clamp, and Wherein the pipeline launch ramp is pivotally mountable on the vessel to permit variation of an angle of inclination of the pipeline launch ramp to vary a water entry angle of the pipeline, and further comprising:

At least one work station having at least one work platform located in or adjacent the opening in the pipeline launch ramp, the at least one work platform being moveable between an operative configuration wherein the at least one work platform is located in the pipeline firing line for allowing cutting and welding operations to be carried out on the pipeline, and a retracted configuration to permit passage of the accessory through the opening and into the installation location for connection to the pipeline;

A transverse beam above the opening;

A carrier slidably mounted on the transverse beam;

Wherein the at least one work station, or the at least one work platform of the at least one work station, is pivotally or rotatably mounted to the carrier to permit the at least one work platform to remain horizontal at all times during variation of the angle of inclination of the pipeline launch ramp and wherein the at least one work platform is mounted on the carrier to rotate relative to the carrier about a rotation axis independent of the transverse beam, the carrier being slidable along the transverse beam for movement of the at least one work platform between the operative and retracted configurations.

2. The apparatus as claimed in claim 1, wherein said storage position of the accessory is inboard of the pipeline launch ramp.

3. The apparatus as claimed in claim 1, wherein said pipeline clamp is moveable between an operative position, wherein the pipeline clamp lies in the pipeline firing line, and a retracted position, wherein said pipeline clamp is moved out of said pipeline firing line to permit passage of the accessory therepast.

4. The apparatus as claimed in claim 1, wherein the pipeline launch ramp comprises a pair of spaced apart, substantially parallel, elongate frame members, mounted upon the vessel in cantilever fashion, the opening being provided along the pipeline firing line between the elongate frame members, downstream of the pipeline guide and upstream of the pipeline clamp.

5. The apparatus as claimed in claim 4, wherein the pair of elongate frame members are pivotally mounted about a pivot axis on the vessel in a manner to allow the angle of inclination of the pipeline launch ramp with respect to the vessel to be varied by pivoting the pipeline launch ramp around the pivot axis.

6. The apparatus as claimed in claim 5, wherein the pipeline clamp is pivotally mounted about a second pivot axis aligned with the pivot axis of pair of the elongate frame members when the pipeline clamp is in an operative clamping position.

7. The apparatus as claimed in claim 1, wherein the apparatus comprises a plurality of work stations spaced apart along the pipeline firing line.

8. The apparatus as claimed in claim 7, wherein each work station of the plurality of work stations comprises a pair of work platforms arranged on opposite sides of the pipeline firing line.

9. The apparatus as claimed in claim 7, wherein the at least one work platform of at least one work station of the plurality of work stations is moveable between an operative and retracted configurations independently of the work platform of any others of the work stations in the plurality of workstations.

10. The apparatus as claimed in claim 1, wherein the at least one work platform of the at least one work station is moveable in a direction transverse to a normal direction of travel of the accessory through said opening.

11. The apparatus as claimed in claim 10, wherein the at least one work platform of the at least one work station is also moveable in a direction parallel to the pipeline firing line.

12. The apparatus as claimed in claim 1, wherein the at least one work station further comprises an upper work station located and configured for enabling welding of an end of a pipeline to an upper region of the accessory and a lower work station located and configured for enabling welding of an end of another pipeline to a lower region of the accessory.

13. The apparatus as claimed in claim 12, wherein the at least one work platform of the upper work station and the at least one work platform of the lower work station are independently moveable between the operative and retracted configurations of the at least one work station.

14. The apparatus as claimed in claim 12, wherein the at least one work station further comprises one or more intermediate work stations provided between the upper and lower work stations for further operations.

15. The apparatus as claimed in claim 14, wherein the at least one work platform of the one or more intermediate work stations are moveable with the at least one work platform of the lower work station.

16. The apparatus as claimed in claim 14, wherein the at least one work platform of the at least one work station is moveable independently of the at least one work platform of the other work stations.

17. The apparatus as claimed in claim 1, wherein the at least one work platform is provided with an enclosure configured for protecting any persons working therein from environmental conditions.

18. The apparatus as claimed in claim 17, wherein at least one of the at least one work platform and the respective enclosure of the work platform is moveable between a first position wherein the work platform is located within the enclosure and a second position wherein the work platform is located outside of the enclosure.

19. The apparatus as claimed in claim 7, wherein the at least one work station is mounted on a support structure provided adjacent the pipeline launch ramp.

20. The apparatus as claimed in claim 1, wherein the at least one work station comprises the carrier mounted on the transverse beam on a first side of the pipeline firing line and a second carrier slidably mounted on the transverse beam on a second side of the pipeline firing line opposite the first side, a first work platform being mounted on the carrier and a second work platform being mounted on the second carrier the first work platform and the second work platform defining the at least one work station, each of the carrier and second carrier being slidable along the transverse beam for movement of the first and second work platforms between operative and retracted configurations.

21. The apparatus as claimed in claim 1, wherein the support member provides an at least partially enclosed access passageway leading to the work platform mounted thereon.

22. The apparatus as claimed in claim 20, wherein the first and second support members each provide an at least partially enclosed access passageway to a work platform mounted thereon.

23. The apparatus as claimed in claim 1, wherein the pipeline launch ramp comprises first and second spaced apart, substantially parallel, elongate frame members, mounted upon the vessel in cantilever fashion, the opening being provided between the first and second elongate frame members, downstream of the pipeline guide and upstream of the pipeline clamp, and
    the at least one work station comprises a first work platform mounted on the first elongate frame member on one side of the pipeline firing line and a second work platform mounted on the second elongate frame member on a second side of the pipeline firing line opposite the first side, each of the first and second work platforms being moveable with respect to the respective elongate frame member between the operative and retracted configurations.

24. The apparatus as claimed in claim 23, wherein
    each of the first work platform and the second work platform is rotatably mounted with respect to the respective elongate frame member upon which it is mounted to permit the work platform to remain at a selected orientation during variation of the angle of inclination of the pipeline launch ramp.

25. The apparatus as claimed in claim 23, wherein each of the first and second work platforms is axially movable along the pipeline firing line.

26. The apparatus as claimed in claim 1, comprising a guide mounted on the vessel for guiding the accessory between the storage position and the installation location, at least one portion of the guide extending from the opening of the pipeline launch ramp to be aligned with or parallel to a longitudinal axis of the vessel through the opening in the pipeline launch ramp.

27. The apparatus as claimed in claim 26, further comprising further portions of the guide extending transverse to the at least one portion of the guide for guiding accessories from respective storage positions into intermediate transport positions for subsequent movement along the at least one portion of the guide to the installation location.

28. The apparatus as claimed in claim 26, further comprising a sled or carriage moveable along the guide on which each accessory is mounted.

29. The apparatus as claimed in claim 28, wherein each accessory is mounted on a respective sled or carriage at an angle substantially corresponding to a normal angle of inclination of the launch ramp.

30. The apparatus as claimed in claim 28, wherein each sled or carriage is provided with manipulator arms for altering the angle at which the accessory is mounted thereon.

31. The apparatus as claimed in claim 1, wherein the rotation axis is a horizontal axis.

32. The apparatus as claimed in claim 1, further comprising at least another work station having at least another work platform rotatably mounted on the carrier at a location spaced from the at least one work platform.

33. A pipelaying vessel for laying a pipeline, the pipeline having accessories on at least one of an end of the pipeline and one or more intermediate locations along the pipeline, comprising:
    A pipeline launch ramp mounted on the vessel, the pipeline launch ramp having a pipeline guide that is shaped, oriented and configured for guiding and controlling the movement of the pipeline along a pipeline firing line in the direction of a seabed,
    A pipeline clamp downstream of the pipeline guide in the direction of the seabed and configured for selectively clamping and supporting the launched pipeline,
    The pipeline launch ramp having an opening downstream of the pipeline guide in the direction of the seabed and upstream of the pipeline clamp from the direction of the seabed for passage through the opening of an accessory passing between a storage position and an installation location in the pipeline firing line for positioning the accessory to allow the accessory to be connected to an end of the pipeline supported by the pipeline clamp or to an intermediate location along the pipeline, wherein the pipeline launch ramp is pivotally mountable on the pipelaying vessel to permit an angle of inclination of the pipeline launch ramp to be varied to vary a water entry angle of the pipeline, and further comprising:
    At least one work station having at least one work platform located in or adjacent the opening in the pipeline launch ramp, the at least one work platform being moveable between an operative configuration wherein the at least one work platform is located in the pipeline firing line for allowing cutting and welding operations to be carried out on the pipeline, and a retracted configuration to permit passage of the accessory through the opening and into the installation location for connection to the pipeline;
    A transverse beam above the opening;
    A carrier slidably mounted on the transverse beam;
    Wherein the at least one work station, or the at least one work platform of the at least one work station, is pivotally or rotatably mounted on the carrier to permit the at least one work platform to remain horizontal at all times during variation of the angle of inclination of the pipeline launch ramp and wherein the at least one work platform is mounted on the carrier to rotate relative to the carrier about a rotation axis independent of the transverse beam, the carrier being slidable along the transverse beam for movement of the at least one work platform between the operative and retracted configurations.

34. The pipelaying vessel as claimed in claim 33, wherein the pipeline laying vessel has a stern and has a moon pool, the pipeline launch ramp provided at the stern of the pipeline laying vessel or over the moon pool, the pipeline firing line laying in a vertical plane aligned with or substantially parallel to a longitudinal axis of the pipeline laying vessel, the pipeline launch ramp is configured such that the accessory can pass through the opening in the pipeline launch ramp in a direction substantially aligned with or parallel to the longitudinal axis of the pipeline laying vessel.

35. A method of laying a pipeline having accessories on a least one of an end of the pipeline and at one or more intermediate locations along the pipeline, the method comprising the steps of:
    Guiding the pipeline along a guide provided on a launch ramp which is provided on a pipeline laying vessel to lay the pipeline from the pipeline laying vessel along a pipeline firing line;

Suspending the pipeline from a clamp, the suspension being downstream of the guide along the firing line;

Cutting the pipeline upstream of the clamp;

Moving an accessory through an opening provided in the launch ramp upstream of the clamp and downstream of the guide from an inboard position on the pipeline laying vessel to an installation location in the pipeline firing line;

Connecting the accessory to an end of the pipeline suspended by the clamp or to an intermediate location along the pipeline;

Releasing the clamp and laying the pipeline and connected accessory from the pipeline laying vessel, wherein the launch ramp is pivotally mountable on the pipeline laying vessel to permit an angle of inclination of the launch ramp to be varied to vary a water entry angle of the pipeline, and Providing at least one work station having at least one work platform located in or adjacent the opening in the launch ramp, the at least one work platform being moveable between an operative configuration wherein the at least one work platform is located in the pipeline firing line for allowing cutting and welding operations to be carried out on the pipeline, and a retracted configuration to permit passage of the accessory through the opening and into the installation location for connection to the pipeline, wherein the at least one work station, or the at least one work platform of the at least one work station, is pivotally or rotatably mounted to permit the at least one work platform to remain horizontal at all times during variation of the angle of inclination of the pipeline launch ramp and wherein the at least one work platform is mounted on a carrier to rotate relative to the carrier about a rotation axis independent of a transverse beam, the carrier being slidable along the transverse beam for movement of the at least one work platform between the operative and retracted configurations.

* * * * *